(No Model.)

J. LEDWARD.
SAW.

No. 297,816. Patented Apr. 29, 1884.

Witnesses
Naw. F. Bellm
Geo. W. M. Given.

Jos. Ledward,
Inventor
per Brown Bros.
Attorneys.

UNITED STATES PATENT OFFICE.

JOSEPH LEDWARD, OF WESTERLY, RHODE ISLAND.

SAW.

SPECIFICATION forming part of Letters Patent No. 297,816, dated April 29, 1884.

Application filed August 24, 1883. (No model.)

*To all whom it may concern:*

Be it known that I, JOSEPH LEDWARD, of Westerly, in the county of Washington and State of Rhode Island, have invented certain new and useful Improvements in Saws, of which the following is a full, clear, and exact description.

This improvement in saws is applicable to circular, jig, band, and other saws; and it consists, essentially, in the adaptation of the blade to plane and smooth either one or both of the walls or sides to the slit or opening made by the ordinary operation of the saw, substantially as hereinafter described, reference being had to the drawings, in which—

Figure 1:
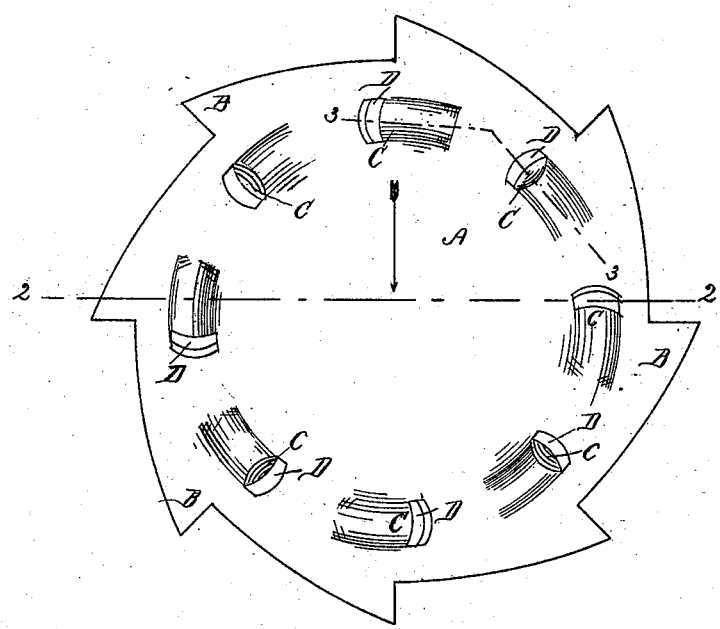
Figure 2:
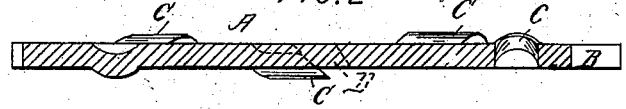
Figure 3:
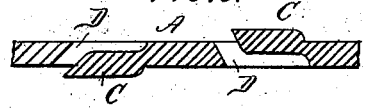

Figure 1 is a face view. Fig. 2 is a cross-section on line 2 2, Fig. 1. Fig. 3 is a cross-section on line 3 3, Fig. 1.

In the drawings, A represents a circular-saw blade having teeth B, all of the ordinary construction, except as to the features of this invention. C C are a series of cutting-edges at each side face of the saw-blade. These cutting-edges are arranged in a circular row, and each is radial, or substantially so, with the axis of the saw-blade; and forward and in front of each the blade is made with a throat or opening, D, through its thickness, all as shown, and so that as the saw-blade in operation saws through a board, said cutting edges, in turn and successively, will plane and smooth that edge or wall of the split in the board, as it is so made by the saw which adjoins them or in contact with which they run as the saw rotates. The throat D for each cutting-edge is made by punching out the metal forming the saw-blade, and the cutting-edge at each throat is then made by beveling off and forcing or pressing out one edge of said throat, and so that, projecting from the side or face of the blade, it will act to plane and smooth the edge of the board with which such face of the saw is in contact when the saw is in operation.

As shown, the saw may be provided with cutting or planing edges C at and upon both of its sides; but, if desired, either side only may be so provided; and, again, the invention herein described is plainly applicable to saw-blades of other forms than circular.

Having thus described my invention, what I claim is—

A saw-blade having cutting-edges C, made integral with the blade, in combination with throats or openings D through the blade, substantially as and for the purpose specified.

In testimony whereof I have hereunto set my hand in the presence of two subscribing witnesses.

JOSEPH LEDWARD.

Witnesses:
EDWIN W. BROWN,
WM. S. BELLOWS.